(No Model.) 2 Sheets—Sheet 1.
J. F. O'ROURKE.
ROPE OR CABLE DRIVE FOR MACHINERY.
No. 511,094. Patented Dec. 19, 1893.
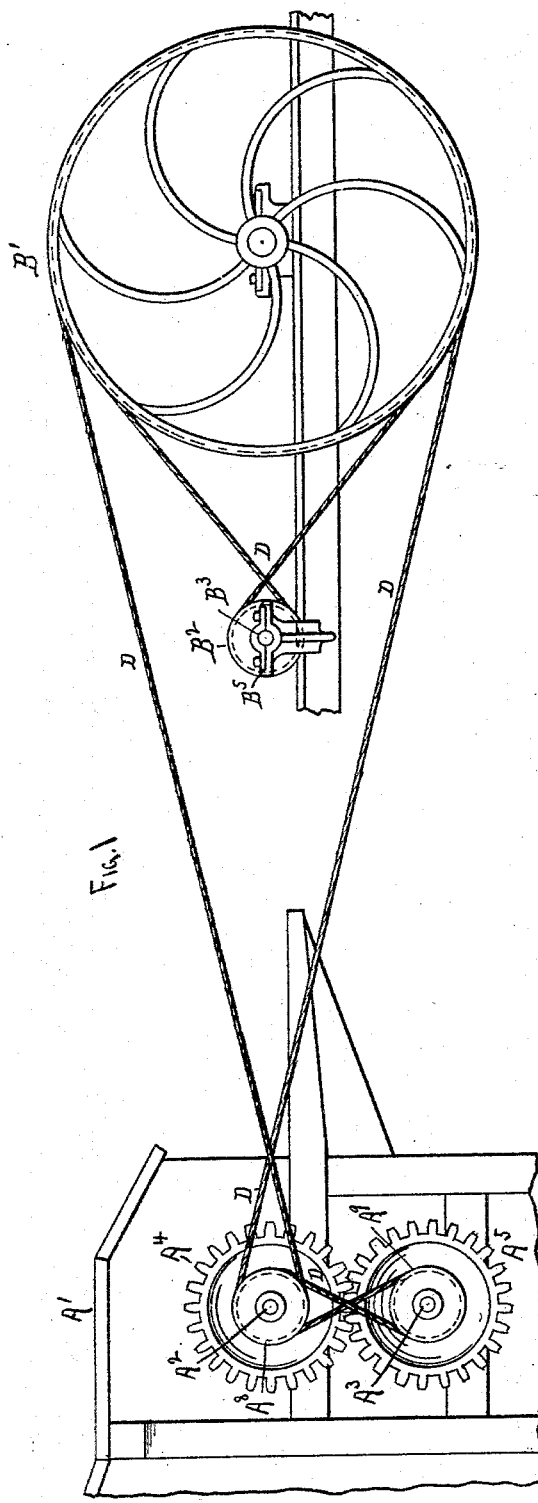
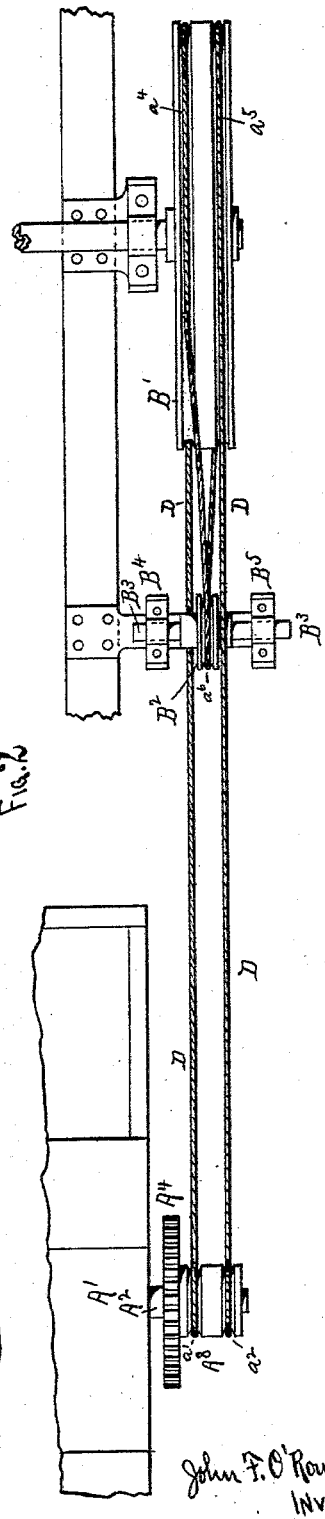
WITNESSES.
H. S. Webster
H. L. Phillips
John F. O'Rourke,
INVENTOR, BY
Charles N. Woodward
Atty.

(No Model.) 2 Sheets—Sheet 2.
J. F. O'ROURKE.
ROPE OR CABLE DRIVE FOR MACHINERY.
No. 511,094. Patented Dec. 19, 1893.
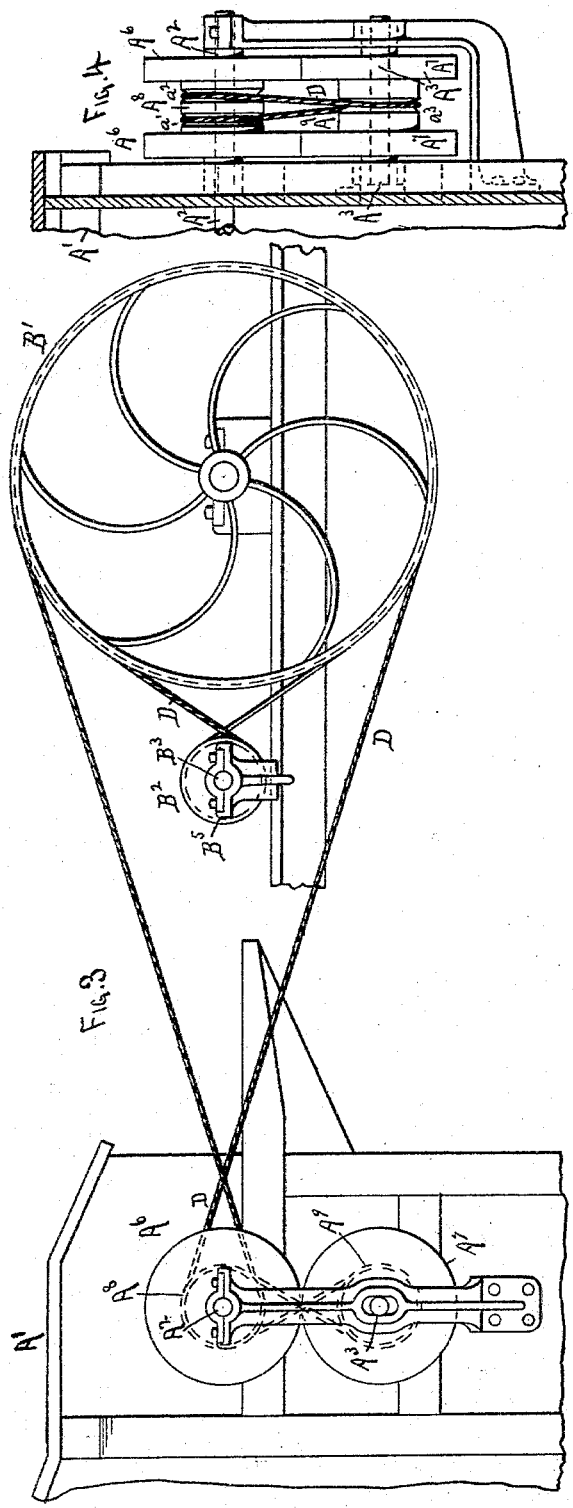
WITNESSES
H. L. Webster
H. L. Phillips
John F. O'Rourke, INVENTOR,
By Charles N. Woodward Atty.

UNITED STATES PATENT OFFICE.

JOHN F. O'ROURKE, OF STILLWATER, ASSIGNOR OF ONE-HALF TO CHARLES W. SEVILLE, OF MINNEAPOLIS, MINNESOTA.

ROPE OR CABLE DRIVE FOR MACHINERY.

SPECIFICATION forming part of Letters Patent No. 511,094, dated December 19, 1893.

Application filed February 1, 1893. Serial No. 460,507. (No model.)

*To all whom it may concern:*

Be it known that I, JOHN F. O'ROURKE, a citizen of the United States, residing at Stillwater, in the county of Washington and State of Minnesota, have invented certain new and useful Improvements in Rope or Cable Drives for Machinery, of which the following is a specification.

This invention relates to mechanism whereby machinery may be driven by ropes or cables, and consists in the construction and arrangement of parts as hereinafter shown and described and specifically pointed out in the claim.

This invention may be employed to operate any kind of machinery, but for the purpose of illustration I have shown it in Figures 1, 2, 3 and 4 arranged to actuate a thrashing machine, to which it is particularly adapted.

Fig. 1 is a side elevation of a portion of a thrashing machine showing my improved driving mechanism arranged to operate it. Fig. 2 is a plan view of the part shown in Fig. 1. Fig. 3 is a view similar to Fig. 1, illustrating a slight modification in the construction. Fig. 4 is an end view of the parts shown in Fig. 3.

$A'$ represents a portion of the feed end frame work of a thrashing machine, $A^2$ being the cylinder shaft. Journaled in suitable bearings on the frame $A'$ beneath the shaft $A^2$ is a shorter counter shaft $A^3$, the two shafts having gears $A^4 A^5$ engaging with each other, as in Figs. 1 and 2, or with friction drums $A^6 A^7$, as in Figs. 3 and 4. The shaft $A^2$ is provided with a drum $A^8$ having two rope or cable grooves or channels $a' a^2$, while the shaft $A^3$ is likewise provided with a drum $A^9$ having one rope or cable groove or channel $a^3$.

$B'$ is the main driving pulley attached to the portable or other form of engine when the mechanism is employed to operate thrashing machines, and $B^2$ is an idler sheave mounted upon a short shaft $B^3$ which is arranged to slide laterally in its bearings $B^4 B^5$, as hereinafter explained. The main driving wheel $B'$ is provided with two rope or cable grooves or channels $a^4 a^5$, while the idler sheave $B^2$ is likewise provided with one rope or cable groove or channel $a^6$.

D represents the endless rope or cable, which passes from one of the channels $a^5$ in the main wheel $B'$ to groove $a^2$ in the drum $A^8$, and thence downward and backward and around the drum $A^9$ in its groove $a^3$, and thence upward, and forward, over the drum $A^8$ in its groove $a'$, (crossing in its passage between the drums the line of the cable which has passed from the drum $A^8$ to the drum $A^9$, but not coming in contact with it, as shown in Figs. 1, 3, and 4.) From the drum $A^8$ the cable passes around the main drum $B'$ in its groove $a^4$, and thence backward around idler $B^2$ in its groove $a^6$, and thence around the drum $B'$ in its groove $a^5$ to the place of beginning.

As before stated, the idler shaft $B^3$ is free to move endwise in its bearings $B^4 B^5$, so that it will automatically assume its proper position with relation to the grooves $a^4 a^5$, so as to properly guide the cable and prevent its running off from the main wheel.

In Figs. 3 and 4 the construction is substantially the same, except that the gears $A^4 A^5$ are replaced by friction drums $A^6 A^7$, as before stated, but the action is substantially the same in both arrangements. When the friction drums $A^6 A^7$ are employed, the counter-shaft $A^3$ will be arranged in movable bearings, so that the wrapping of the cable around the drums $A^8 A^9$ will draw the drum $A^8$ toward the drum $A^9$, and thus increase the frictional contact between the drums $A^6 A^7$.

By this simple arrangement, the wrappings of the rope or cable encircle so much of the surfaces of the main driving wheel and the drum on the driven shaft $A^2$, that the tractive force is greatly increased, and the power of the mechanism correspondingly increased.

Having thus described my invention, what I claim as new is—

In a rope or cable drive, the combination of the main shaft $A^2$ with sheave or drum $A^8$, counter-shaft $A^3$ having drum $A^9$, and with connecting gears, main cable drum $B'$ and idler sheave $B^2$ self adjustable laterally, a rope or cable D passing around and enwrapping said drums, main wheel and idler, substantially as and for the purpose set forth.

In testimony whereof I have hereunto set my hand in the presence of two subscribing witnesses.

JOHN F. O'ROURKE.

Witnesses:
LOUIS L. MANWARING,
THOS. FALLON.